May 13, 1941.  D. E. GOMMEL  2,241,703
HACK SAW
Filed May 6, 1939.
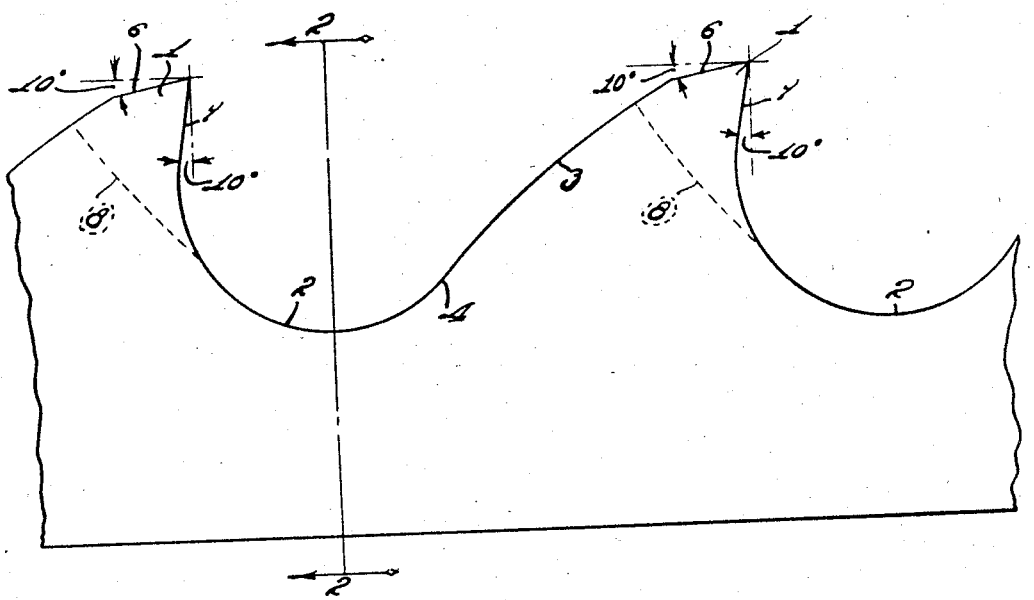
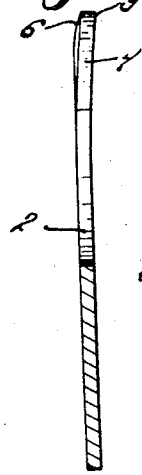
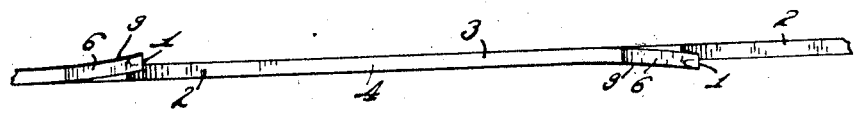
INVENTOR.
Dewey E. Gommel,
BY
ATTORNEYS.

Patented May 13, 1941

2,241,703

UNITED STATES PATENT OFFICE 2,241,703

HACK SAW

Dewey E. Gommel, Indianapolis, Ind., assignor to E. C. Atkins and Company, Indianapolis, Ind., a corporation of Indiana Application May 6, 1939, Serial No. 272,063

16 Claims. (Cl. 29—95)

The invention relates to improvements in metal cutting saws.

One of the objects of the invention is to improve the tooth formation of a hack saw to provide a saw in which the speed of the cut is materially increased, the life of the saw is materially increased, and to provide a hack saw in which the necessity of frequent sharpening and setting of the teeth of the saw is rendered unnecessary.

For the purpose of disclosing the invention, I have illustrated, in the accompanying drawing, a segment of a hack saw blade showing a number of teeth thereof and in said drawing Fig. 1 is a side elevation of a portion of a hack saw blade;

Fig. 2 is an enlarged front elevation of a tooth of the saw; and

Fig. 3 is an enlarged plane of a tooth of the saw.

In the structure illustrated, the teeth 1 of the saw, have formed between the same a gullet 2, which gullet is arcuate in form and is approximately one-half the pitch of the teeth of the saw.

In the structure illustrated, the depth of the gullet is .45 times the pitch of the teeth. The radius of the circle on which the gullet 2 is formed is .27 times the pitch of the teeth or the diameter of the gullet is approximately one-half of the pitch and the peripheral length of the gullet is somewhat less than a half circle. The curve 3 of the tooth into which the gullet merges, has a radius 1.5 times the pitch of the teeth. The point 4 at which the gullet merges into the back curve of the tooth is behind a line drawn from the center of the circle on which the back curve of the tooth is drawn to the point of the tooth. Due to this location of the merger point of the curve of the gullet and the back curve, chips cut by the tooth will freely curl in the gullet and there is no hump on the back of the tooth which would tend to obstruct the movement of the chip. The back curve radius 3 of the tooth merges into the top 6 of the tooth and the length of the top of the tooth is .125 times the pitch. This top 6 of the tooth is straight and has an angle of 10 degrees, as is the case of the front hook 7 of the tooth.

The tooth is set on a line 8 extending approximately 45 degrees from the vertical line of the face of the tooth, which will impart to the tooth a peculiar twist. As a result of the setting on the 45 degree angle line, the face of the tooth will incline at an angle to the cut greater than a right angle. Therefore, the face of the tooth is machined or otherwise finished off to bring this face at right angles to the line of cut to thus present a square face to the cut. Also, as a result of the setting of the tooth, the top 6 of the tooth would be somewhat angularly disposed and in order to overcome this, the top of the tooth is machined or otherwise finished off until the top of the tooth is parallel with the bottom of the cut, in order to present a square tooth surface to the cut.

In addition to the above construction, I have found it advantageous to slightly round the outer top edge 9 of each tooth on a circle having a diameter of approximately 1/64 of an inch. This light rounding of the upper edge prevents the breaking down of this edge, materially increasing the efficiency of the tooth in cutting.

Due to the above construction, I have provided in a hack saw extremely deep gullets so curved as to cause the chip to roll up during the cutting operation which rolled chip will be discharged in its entirety as the saw clears the cut.

Furthermore, due to the fact that the gullet is not as deep as the diameter of the circle on which the gullet is drawn, as the chip which is removed from the tooth curls on this gullet and turns up at its free end, it will encounter the bottom of the cut, thereby bending the chip down into a tighter curl, thereby providing ample space in the gullet for the accommodation of the chip as it is removed from the cut by the tooth. While I have illustrated and described my invention as being particularly applicable to hack saws, it will be understood that the invention is also applicable to other types of metal cutting saws.

I claim as my invention:

1. A metal cutting saw blade having circular gullets between the teeth substantially one-half the pitch of the teeth, the teeth being curved throughout a portion of their backs on a radius substantially 1.5 times the pitch of the teeth and merging in the gullets at a point behind a line drawn from the tooth point to the center of the circle on which the back curve is drawn.

2. A metal cutting saw blade having curved gullets between the teeth, having a depth substantially one-half of the pitch of the teeth, said gullets merging into a straight tooth hook having a substantially 10 degree angle.

3. A metal cutting saw blade having curved gullets between the teeth, having a diameter substantially one-half the pitch of the teeth, side gullets merging into a straight hook of the teeth which is substantially at a 10 degree angle and into a reversely curved back portion of a tooth, said reversely curved back portion being substantially one and one-half times the pitch of the teeth.

4. A metal cutting saw blade having a circular gullet, the circle of said gullet having a diameter substantially one-half the pitch of the teeth, a portion of the backs of the teeth being reversely curved on a radius substantially one and one-half times the pitch of the teeth and merging into the gullet at a point behind the line drawn through the center of the circle on which the backs of the teeth are drawn and the point of the tooth, said curved portion also merging into a straight back of the tooth approximately .125 times the pitch and extending at a 10 degree angle.

5. A metal cutting saw blade having circular gullets between the teeth and a portion of the backs of the teeth reversely curved, the back of each tooth being straight from the point for a distance, at least a portion of said teeth being set and the bending line of each tooth, in setting, extending at an angle of 45 degrees to the vertical line from the point of the tooth and the faces and tops of the teeth extending respectively at right angles to the line of cut and parallel with the bottom of the cut.

6. A metal cutting saw blade having circular gullets between the teeth, the diameters of which are substantially one-half the pitch of the teeth, the front hooks of the teeth being straight and having a 10 degree angle, said gullets merging into the teeth of the blade having curved backs, the radius of the curve being substantially one and one-half the pitch of the teeth, said back merging into the tops which are substantially .125 times the pitch of the teeth and have a 10 degree angle, at least a portion of said teeth being set and the bending line in setting extending at an angle less than a right angle to the vertical line of the face of the tooth and the face and tops of the teeth extending respectively at right angles to the line of cut and parallel with the bottom of the cut.

7. A metal cutting saw blade having circular gullets between the teeth, the depths of which are substantially one-half of the pitch of the teeth and the periphery of the circles being less than a half circle.

8. A metal cutting saw blade having circular gullets between the teeth substantially one-half the pitch of the teeth, the teeth being curved throughout a portion of their backs and merging in the gullets at a point behind a line drawn from the tooth point to the center of the circle on which the back is curved.

9. A metal cutting saw blade having curved gullets between the teeth having a depth substantially one-half the pitch of the teeth, said gullets merging into a hook tooth having an angle less than 15 degrees.

10. A metal cutting saw blade having circular gullets between the teeth, the depth of which are substantially one-half the pitch of the teeth, the teeth being curved through a portion of their backs and merging into the gullets at a point behind a line drawn from the tooth point to the center of the circle on which the back curve is drawn.

11. A metal cutting saw blade having circular gullets between the teeth and a portion of the backs of the teeth reversely curved, the back of each tooth being straight from the point for a distance to the rear, at least a portion of said teeth being set, the bending line of each tooth, in setting, extending at an angle of less than 90 degrees to a vertical line from the point of the tooth and the faces and tops of the teeth extending respectively at right angles to the line of cut and parallel to the bottom of the cut.

12. A metal cutting saw blade having circular gullets between the teeth, the diameters of the circles of which are substantially one-half of the pitch of the teeth, at least a portion of said teeth being set and the faces and tops of the teeth extending respectively at right angles to the line of cut and parallel to the bottom of the cut.

13. A metal cutting saw blade having circular gullets between the teeth, the depths of which are substantially one-half of the pitch of the teeth, at least a portion of said teeth being set and the faces and tops of the teeth extending respectively at right angles to the line of cut and parallel with the bottom of the cut.

14. A metal cutting saw blade having a circular gullet between the teeth, the periphery of the circles being less than a half circle and the diameter of the circles being substantially one-half of the pitch of the teeth, at least a portion of said teeth being set and the faces and tops of the teeth extending respectively at right angles to the line of cut and parallel to the bottom of the cut.

15. A metal cutting saw blade having at least a portion of the teeth set, the bending line of each tooth, in setting, extending at an angle less than 90 degrees to a vertical line from the point of the tooth and the faces and tops of the teeth extending respectively at right angles to the line of cut and parallel to the bottom of the cut.

16. A metal cutting saw blade having at least a portion of its teeth set, the bending line of each tooth, in setting, extending at an angle of 45 degrees to a vertical line from the point of the tooth and the faces and tops of the teeth extending respectively at right angles to the line of cut and parallel to the bottoms of the teeth.

DEWEY E. GOMMEL.